W. A. BUTLER.
Water-Trap.

No. 165,302.

Patented July 6, 1875.

UNITED STATES PATENT OFFICE.

WILLIAM A. BUTLER, OF NEW YORK, N. Y.

IMPROVEMENT IN WATER-TRAPS.

Specification forming part of Letters Patent No. 165,302, dated July 6, 1875; application filed June 11, 1875.

*To all whom it may concern:*

Be it known that I, WILLIAM A. BUTLER, of New York, in the county and State of New York, have invented a new and useful Improvement in Water-Traps; and I do hereby declare that the following is a full, clear, and exact description of the same, reference being had to the accompanying drawing, which forms part of this specification.

This invention consists in a trap of novel construction, whereby its cost, as compared with other traps, is diminished, but its strength and durability are increased.

The trap may be of S or other shape, and is made of two halves or similar pieces, which may be either of cast or wrought metal, and united by soldering or burning them together; but the united seam, instead of being formed along the sides and following or coinciding with the curvature of the trap, runs along the front or back, and is in a plane running through the center of the trap and intersecting its curvature.

The trap made in this way may have its two halves produced from sheet metal by the simple and cheap process of stamping between dies, instead of by the more expensive process of drawing, rolling, or hammering necessary to produce the two halves of a sheet-metal trap of the form in which they have heretofore been made, and the joint, being flat, is more easily made; and, moreover, the trap is made of more nearly uniform thickness in all its parts.

Figure 1:
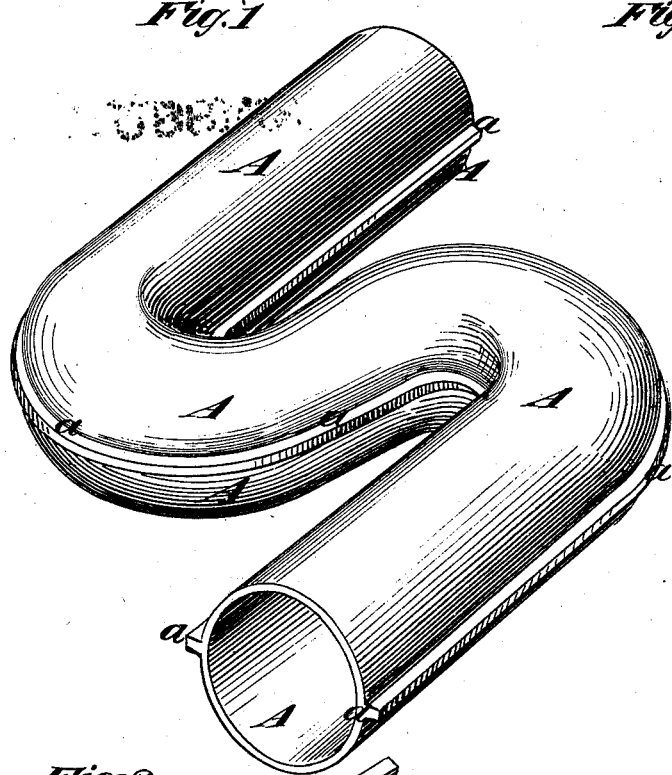
Figure 2:
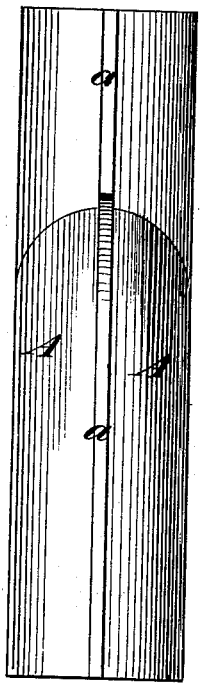
Figure 3:
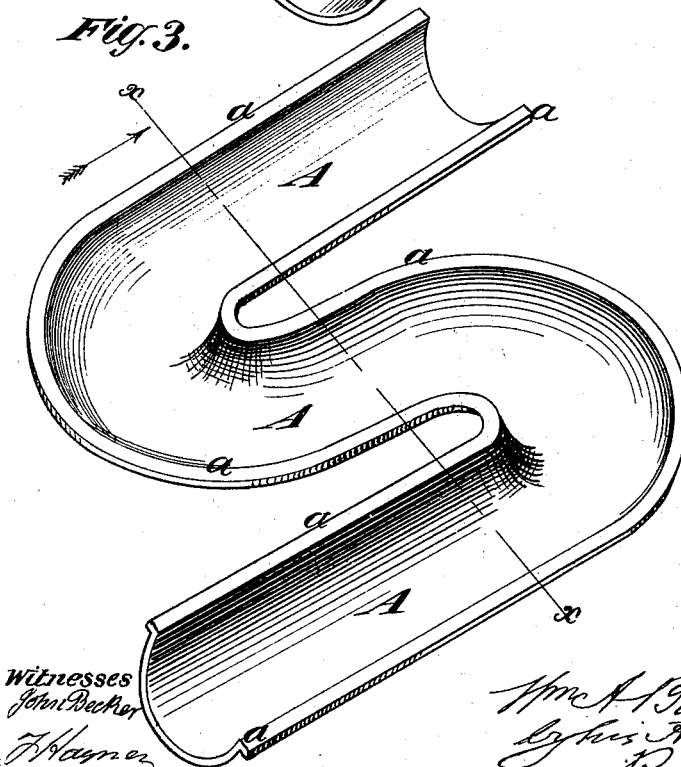
Figure 4:
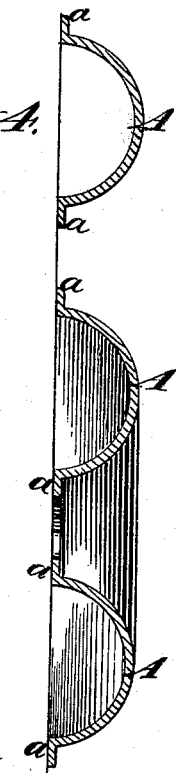

In the accompanying drawing, Figure 1 is a perspective view of my improved trap. Fig. 2 is a front view of the same, showing the straight central seam; and Fig. 3 is a perspective view of one of the two halves or similar pieces of which the trap is composed. Fig. 4 is a transverse section of the same in the line $x\,x$ of Fig. 3.

Similar letters of reference indicate corresponding parts in the several figures.

The two halves A A of which the trap is composed are represented as each formed with a simple flange, $a$, the face of which presents a plane surface; and when the faces are placed together they meet in a plane centrally intersecting the trap from top to bottom and from front to back.

When the trap is made of lead, with flanges of this kind, the two halves, on being placed together with the faces of the flanges in contact, may be easily and very quickly united by "burning" them together by the aid of a blow-pipe without the use of solder. The joint made in this way forms a stiffening-rib, and gives great strength to the trap.

Traps made in this way possess advantages over those made in the usual way of sheet or wrought metal, in being of more nearly uniform thickness, in having a seam which is stronger than any seam or joint running along the sides can be made, and they possess the advantage over cast-lead traps, cast in one piece, in their being capable of having any desired amount of dip given to them.

What I claim as my invention is—

A metal trap composed of two similar portions or halves, united by a seam which extends directly along the trap and from front to back in a plane centrally intersecting the trap, substantially as herein described.

WILLIAM A. BUTLER.

Witnesses:
HENRY T. BROWN,
VERNON H. HARRIS.